UNITED STATES PATENT OFFICE.

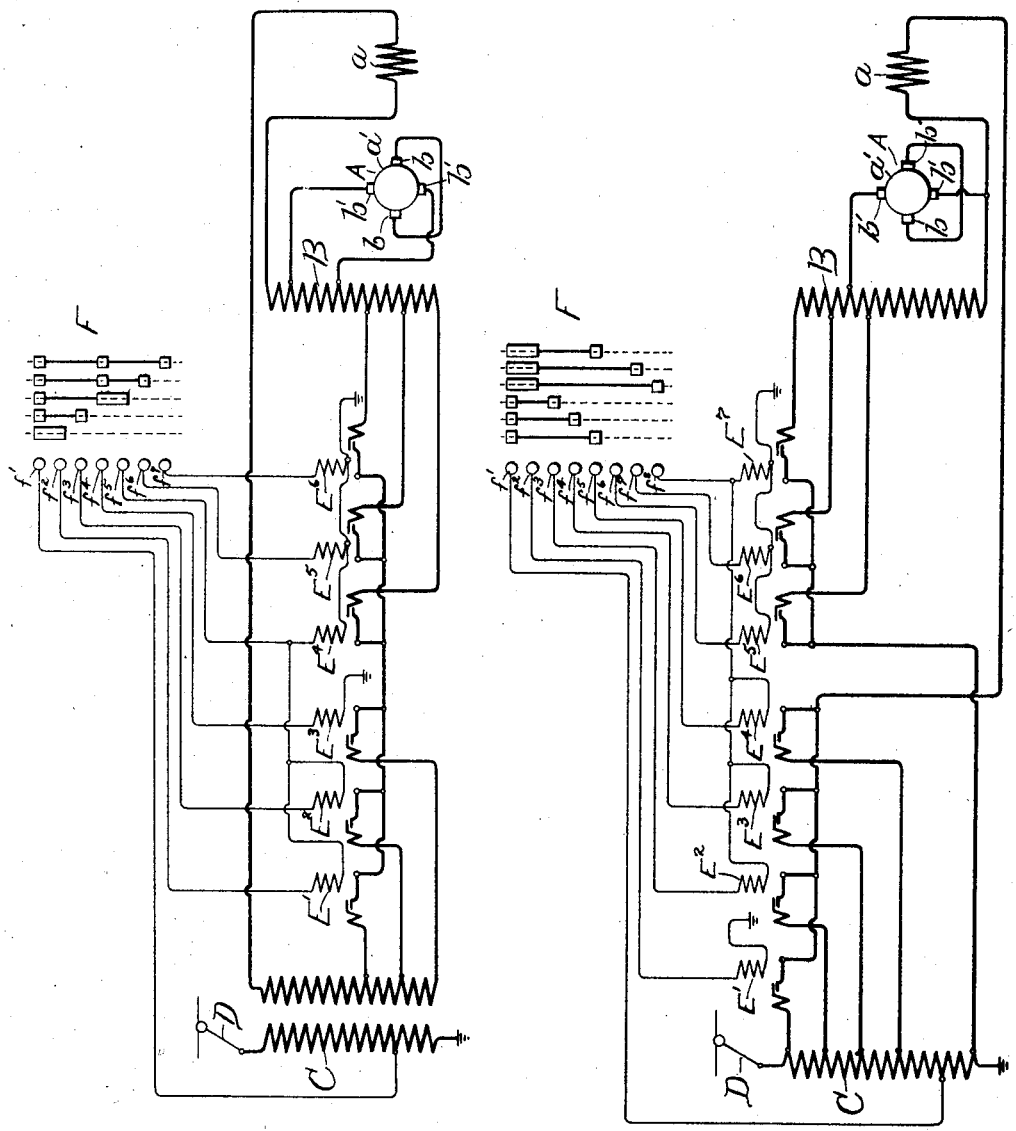

FRIEDRICH EICHBERG, OF BERLIN, GERMANY, ASSIGNOR TO GENERAL ELECTRIC COMPANY, A CORPORATION OF NEW YORK.

MOTOR CONTROL.

No. 890,627.  Specification of Letters Patent.  Patented June 16, 1908.

Application filed January 23, 1907. Serial No. 353,648.

*To all whom it may concern:*

Be it known that I, FRIEDRICH EICHBERG, a subject of the Emperor of Austria-Hungary, residing at Berlin, Germany, have invented certain new and useful Improvements in Motor Control, of which the following is a specification.

My invention relates to alternating-current motor control systems, and particularly to control systems for railway motors provided with regulating transformers; and its object is to provide a novel arrangement of the controlling switches possessing certain advantages not heretofore obtained. It has been proposed heretofore to provide such systems with two transformers,—one connected on its primary side to the source of current, and the other connected on its secondary side to the motor; the secondary side of the first transformer being connected to the primary side of the second. When such transformers have been arranged heretofore with means for varying the ratio of transformation to regulate the motor speed and torque, the regulation has been obtained by means of switches connected to the secondary sides of the transformers.

My invention consists in connecting the switches to the secondary side of the transformer connected to the source and to the primary side of the transformer connected to the motor. By this arrangement I am enabled to obtain with single-pole switches a double break in the circuit containing the switches. Moreover, the switches may be so arranged that the difference in voltage at the several switches is not great, so that the switches may be mounted close together, or even in a single casing. Furthermore, since all of the switches are in the same circuit and handle currents of the same amount and voltage, they can all be exactly alike in design.

While not limited in its broader aspect to any one type of motor, my invention is particularly applicable to a type of motor described in former applications filed by G. Winter and myself, comprising an inducing winding; a rotor winding provided with commutator and brushes short-circuiting it on the line of magnetization of the inducing winding, and a second set of brushes displaced ninety electrical degrees from the first set and carrying the magnetizing current of the motor. To obtain a series characteristic in such a motor, and to regulate its speed and torque, a transformer may be provided in series with the inducing winding with its secondary connected to the second set of brushes. By varying the ratio of transformation of the transformer the motor may be regulated as to speed and torque. The transformers that have been provided heretofore for this purpose have been arranged to have the number of secondary turns varied, but by my present invention I arrange the transformer to have its primary turns varied in number. When used in combination with a transformer inserted between the source and the motor, I am enabled to obtain the advantages which have been above mentioned.

My invention will best be understood by reference to the accompanying drawings, in which Figure 1 shows diagrammatically a motor-control system arranged in accordance with my invention, and Fig. 2 shows a modification of the same.

In the drawings A represents the motor. I have shown only a single motor, but it will be understood that my invention is equally applicable to any number of motors connected either in series or in parallel.

$a$ represents the inducing winding of the motor, and $a^1$ the armature or rotor winding, which is provided with commutator brushes $b\ b$ short-circuiting the armature winding on the line of magnetization of the inducing winding. $b'\ b'$ represent a second set of brushes displaced ninety electrical degrees from the first set.

B represents a transformer or auto-transformer connected in series with the inducing winding $a$. The secondary leads of the transformer are connected to the brushes $b'\ b'$ to supply the magnetizing current to the motor through these brushes. The transformer B is provided with a number of primary leads, as shown. C represents a second transformer, which is connected on its primary side to the source of current indicated by the trolley D. The secondary is provided with a plurality of leads, as shown.

In Fig. 1 I have shown the transformer B as an auto-transformer, and the transformer C as a transformer with two windings. This difference is immaterial, and it will be understood that either transformer may have either one or two windings, as preferred. It is ordinarily preferable, where the primary and secondary voltages differ largely, to use a transformer with two windings, while, if the primary and secondary voltages do not greatly differ, an auto-transformer is cheaper and therefore preferable. $E^1$ to $E^6$ represent magnetically-actuated switches connected to the secondary leads of the transformer C, and to the primary leads of the transformer B, and arranged to connect each transformer to different points on the other. In other words, these switches act to connect the two transformers to each other and to vary the effective number of secondary turns of transformer C, and the effective number of primary turns of transformer B. F represents the master switch, provided with contact-fingers $f^1$ to $f^7$, controlling the magnetically-actuated switches or contactors $E^1$ to $E^6$. The actuating windings of these contactors are supplied from any suitable source of current. I have shown them in Fig. 1 connected in a circuit including a small portion of the primary winding of transformer C.

The circuit connections in the different positions of the master controlling switch F may be traced as follows: When this switch is moved to its first running position, as indicated by the first dotted line, a circuit is closed from a point on transformer C through fingers $f^1$ and $f^2$ to contactor winding $E^1$, thence through contactor $E^4$ to ground. Contactors $E^1$ and $E^4$ consequently pick up their armatures connecting the inner secondary lead of transformer C to the lower terminal of transformer B. The minimum secondary voltage of transformer C is consequently impressed upon the inducing winding $a$ of the motor and transformer B in series. All of the turns of the transformer B are included in circuit, so that the ratio of primary to secondary turns of this transformer is at its maximum value, and the proportion of current flowing through the brushes $b'$ $b$,—that is, the magnetizing current, to the current flowing through the inducing winding $a$, is a maximum. In other words, the cross-magnetization of the motor is maximum, so that it starts with high torque. In the second position of switch F, contactor $E^1$ is deënergized, and contactor $E^2$ is energized; thereby including a greater number of secondary turns of transformer C in circuit, and increasing the voltage impressed upon the motor and transformer B in series. In the third position of the switch, contactor $E^2$ is deënergized and contactor $E^3$ is energized, thereby impressing the full secondary voltage of transformer C on the motor and transformer B. In its fourth position, contactor $E^4$ is deënergized, and contactor $E^5$ is energized, thereby reducing the effective primary turns of transformer B, and consequently reducing the secondary current of the transformer and the cross-magnetization of the motor, allowing the motor to speed up.

In the fifth position of switch F contactor $E^5$ is deënergized, and contactor $E^6$ is energized, thereby reducing the primary turns of transformer B to minimum value and producing the minimum cross-magnetization of the motor. This is the position of maximum speed. It will be noted that when switch F is returned to its off-position, the circuit from the secondary side of transformer C to the primary side of transformer B is opened in two places, and this result is obtained with single-pole switch contacts. In this figure all the contactors are placed on the same side of the circuit; the other side of the circuit, extending from the upper secondary terminal of transformer C to the right-hand terminal of the inducing winding $a$, containing no switches. The advantage of placing the contactors all in the same side of the circuit, as shown in Fig. 1, is that they can all be connected together, as shown in this figure, so that the movable contacts of all the contactors may be at exactly the same potential, while the stationary contacts are nearly the same potential. There is consequently little danger of a short-circuit between different contactors, so that they may all be placed in a single casing, if desired.

On the other hand, if the contactors are divided between the two sides of the circuit, the circuit is still broken in two places, and the motor is totally disconnected from the transformer C when the controlling switch is in off-position. This modification is shown in Fig. 2. The circuit connections established by the contactors are similar to those established in Fig. 1, and require no detailed explanation. It will be noted that contactors $E^1$ to $E^4$ are in one side of the circuit, while contactors $E^5$ to $E^7$ are in the other side, so that when switch F is in its off-position, as shown, both sides of the circuit are open and the motor is wholly disconnected from transformer C. In this figure, transformer C is shown as an auto-transformer, instead of as a two-winding transformer, as in Fig 1. As has been explained, this difference is immaterial, and the choice between the two forms is determined by the particular conditions of each case.

What I claim as new and desire to secure by Letters Patent of the United States, is,—

1. In combination with an alternating-current motor and a source of current therefor, a transformer having its primary winding connected to the source, a second transformer having its secondary winding connected to the motor, and means for connecting the other two windings of the two transformers to different points on each other.

2. In combination with an alternating-current motor and a source of current therefor, a transformer connected on its primary side to the source and having more than two secondary leads, a second transformer connected on its secondary side to the motor and having more than two primary leads, and switch contacts for connecting together in different combinations the secondary leads of the first transformer and the primary leads of the second transformer.

3. In combination with an alternating-current motor and a source of current therefor, a transformer connected to the source, a second transformer connected to the motor, connections between said transformers, and switch contacts arranged to vary the effective number of secondary turns of the first transformer and the effective number of primary turns of the second transformer.

4. In combination with an alternating-current motor and a source of current therefor, a transformer having its primary winding connected to the source, a second transformer having its secondary winding connected to the motor, and magnetically-actuated switches arranged to connect the other two windings of the two transformers to different points on each other.

5. In combination with an alternating-current motor and a source of current therefor, a transformer connected on its primary side to the source and having more than two secondary leads, a second transformer connected on its secondary side to the motor and having more than two primary leads, and magnetically-actuated switches arranged to connect together in different combinations the secondary leads of the first transformer and the primary leads of the second transformer.

6. The combination with an alternating-current motor, comprising an inducing winding, a rotor winding provided with commutator and brushes short-circuiting it on the line of magnetization of the inducing winding, and a second set of brushes displaced ninety electrical degrees from the first set, of a transformer connected in series with the inducing winding, secondary leads from said transformer to the second set of brushes, and means for varying the effective number of primary turns of said transformer.

7. The combination with an alternating-current motor comprising an inducing winding, a rotor winding provided with commutator and brushes short-circuiting it on the line of magnetization of the inducing winding, and a second set of brushes displaced ninety electrical degrees from the first set, of a transformer connected in series with the inducing winding, secondary leads from said transformer to the second set of brushes, means for varying the effective number of primary turns of said transformer, a source of current for the motor, a second transformer connected on its primary side to the source and on its secondary side to the motor and first transformer, and means for varying the effective number of secondary turns of the second transformer.

In witness whereof, I have hereunto set my hand this 8th day of January, 1907.

FRIEDRICH EICHBERG.

Witnesses:
EMANUEL ROSENBERG,
MAXIMILIAN FINNER.